United States Patent [19]

Kawabata et al.

[11] 4,288,747
[45] Sep. 8, 1981

[54] SELF-SCANNING APPARATUS HAVING IMPROVED MEASURING RANGE FOR MEASURING CONTOUR OF A METALLIC BODY

[75] Inventors: Shigeo Kawabata, Tokyo; Norihisa Inazaki, Yokohama, both of Japan

[73] Assignee: Nippon Kokan Kabushiki Kaisha, Tokyo, Japan

[21] Appl. No.: 31,337

[22] Filed: Apr. 19, 1979

[30] Foreign Application Priority Data

Apr. 27, 1978 [JP] Japan .............................. 53-55258[U]

[51] Int. Cl.³ .................. G01B 7/04; G01B 33/12; G01N 27/82; H03K 5/00
[52] U.S. Cl. .................................... 324/207; 324/243; 328/151
[58] Field of Search .............. 324/207, 208, 234, 236, 324/239, 243; 340/150; 328/104, 154, 156, 151

[56] References Cited

U.S. PATENT DOCUMENTS

| | | | |
|---|---|---|---|
| 3,867,689 | 2/1975 | Mori et al. | 324/237 |
| 3,997,835 | 12/1976 | Ando et al. | 324/207 |
| 4,007,358 | 2/1977 | Iguchi et al. | 328/104 |
| 4,030,027 | 6/1977 | Yamada et al. | 324/207 |

FOREIGN PATENT DOCUMENTS 2601250  1/1976  Fed. Rep. of Germany ...... 324/207

*Primary Examiner*—Gerard R. Strecker
*Assistant Examiner*—Walter E. Snow
*Attorney, Agent, or Firm*—Fleit & Jacobson

[57] ABSTRACT

An apparatus for measuring the contour of a conductive object to be measured, includes eddy-current distance measuring means having a plurality of detection sensors which are arranged in a row at positions along a predetermined reference line, and the sensors are sequentially energized at a predetermined scanning period so as to self-scan the distance from the surface of the object and thereby to produce for each scanning cycle a contour output signal combining the outputs of all the sensors.

3 Claims, 3 Drawing Figures

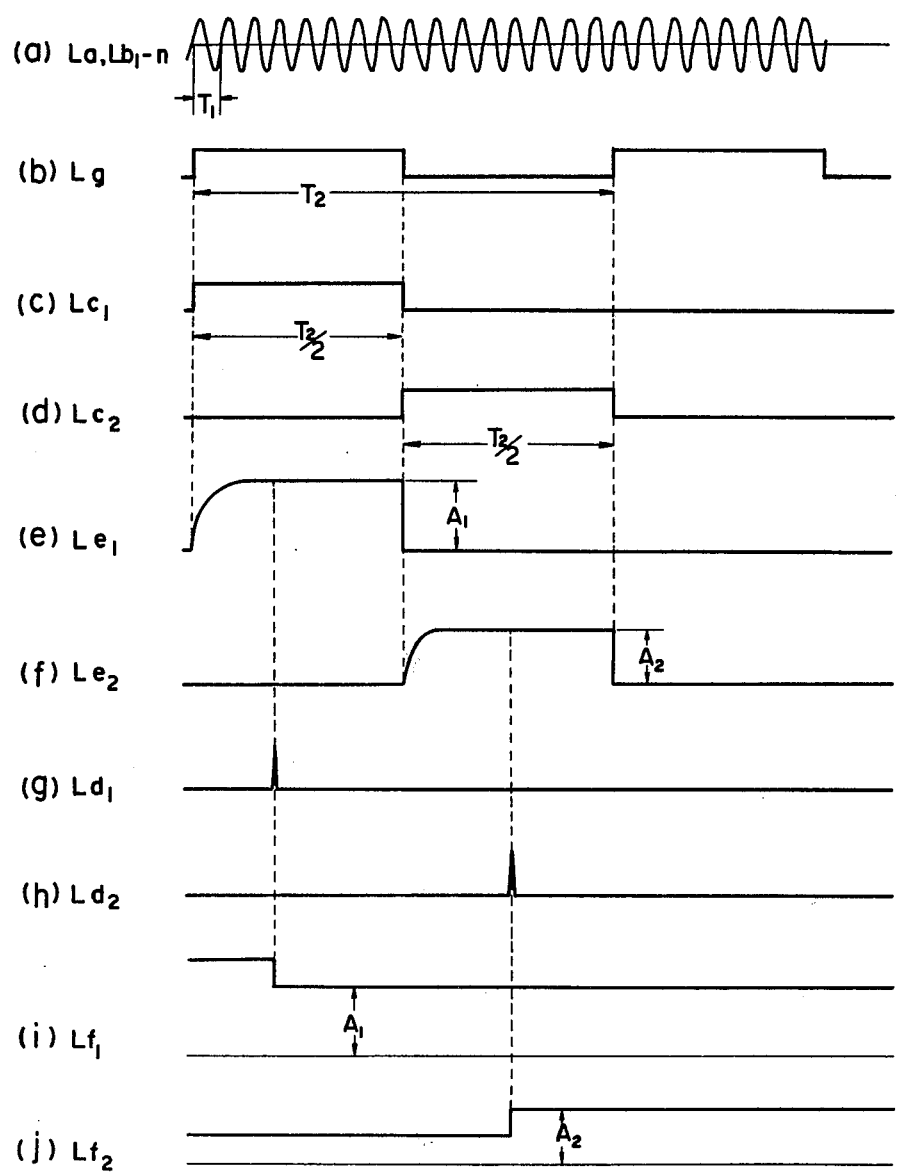

SELF-SCANNING APPARATUS HAVING IMPROVED MEASURING RANGE FOR MEASURING CONTOUR OF A METALLIC BODY

BACKGROUND OF THE INVENTION

The present invention relates to a self-scanning type eddy-current contour measuring apparatus including a plurality of eddy-current distance detection sensors which are arranged in a row along a predetermined reference line so as to be close to each other and extend over a predetermined width, whereby the gap or distance of the surface of a conductive object to be measured from the reference line is measured within the predetermined width in a short period of time to measure the contour of the object to be measured.

In order that an eddy-current distance measuring apparatus of the type disclosed in U.S. Pat. No. 3,867,689, No. 3,997,835, and No. 4,030,027 may be used to measure the distance of the surface of an object to be measured and thereby to determine the contour of the object, it is necessary that the detection sensor of the eddy-current distance measuring apparatus is positioned along a predetermined fixed reference line and the distance of the surface of an object to be measured from the reference line is measured continuously or intermittently at small intervals over the entire range of the width to be measured.

In this case, by moving the sensor along the reference line through a manual drive, motor drive or the like, it is possible to continuously measure the distance of an object to be measured from the reference line. This method is effective in cases where the contour of an object to be measure does not change with time or the driving of the distance measuring sensor is not restricted in time. However, this method cannot be used in cases where the movement of the measuring sensor is restricted in time, such as when the desired speeding up is not possible, where the contour of objects to be measured changes with time, or where the object to be measured is fed in the lengthwise direction of the reference line or at right angles to it.

In such cases, by arranging a plurality of distance measuring sensors in a row so as to be adjacent to each other and to cover the extent of the desired width be measured, it is possible to measure the distance between an object to be measured and the sensors intermittently at intervals of the spacing between the sensors, and thereby to determine the contour or the like of the object. In any case of the known distance measuring methods (the oscillation method, bridge method, feedback amplification method, etc.), this type of distance measuring apparatus having a plurality of sensors comprises, as its principal parts, detecting means (a group of sensors) and arithmetic means, and the detecting means generates AC magnetic flux as a matter of course for the distance measuring apparatus of the eddy-current type. As a result, if the plurality of sensors are arranged close to each other and are actuated simultaneously, a mutual inductive action will be caused between the sensors, and consequently the sensors will interfere with each other, thus causing an error in the measured value. On the other hand, even if the sensors are each provided with the desired distance output characteristic, it is difficult to adjust the characteristics of the sensors to obtain the desired overall characteristic or the interference between the sensors in operation will make the output characteristics nonuniform, thus requiring the provision of additional circuits in the arithmetic means and thereby unavoidably making the arithmetic means complicated.

In addition, since the distance output characteristic of the distance measuring apparatus is calibrated by simultaneously actuating the plurality of sensors, even if only one of the sensors becomes faulty, this will cause the measured value of the other sound sensors to involve an error, thus making it in fact difficult to continue the measurement in this condition.

In this case, while it is conceivable to arrange the sensors so as to be apart from each other by a distance sufficient to prevent the sensors from interfering with each other, and thereby to prevent any detrimental effects of the mutual interference of the sensors, this is contrary to the intended objective of making the measuring sensor spacing as small as possible. With another method in which a magnetic shield is provided for each of the sensors, the existence of the conductive material around the sensors deteriorates the distance output characteristic, and any attempt to increase the size of the sensors to improve the distance output characteristic will considerably increase the size and weight of the apparatus which has already been increased in size and weight by the provisions of the magnetic shields. Particularly, where the available space for mounting the sensors is limited, the intended measurement will be made difficult.

SUMMARY OF THE INVENTION

Noting the fact that it is extremely difficult to arrange a plurality of sensors close to each other and bring them into operation simultaneously so as to measure the distance of an object to be measured and thereby to determine the contour of the object, the present invention has been made with a view to overcoming the difficulty.

It is therefore an object of the present invention to provide a contour measuring apparatus in which there is no need to provide any magnetic shield for each of a plurality of sensors arranged close to each other in a row and moreover a greater measuring range is ensured.

It is another object of the invention to provide a contour measuring apparatus in which a plurality of sensors are arranged without the danger of causing any measurement error due to the inductive interference between the sensors.

It is still another object of the invention to provide an eddy-current contour measuring apparatus in which failure of only one or two of a plurality of sensors does not require any readjustment of the sensors as a whole but requires only the readjustment of the defective sensor or sensors, and moreover the failure of one or two of the sensors does not make it necessary to interrupt the continuous measuring operation.

It is still another object of the invention to provide a contour measuring apparatus which is capable of continuously measuring the contour of an object to be measured, such as a rolled steel sheet or plate which is travelling.

In accordance with the present invention there is thus provided a self-scanning type contour measuring apparatus wherein there are provided a plurality of eddy-current distance measuring units, each adapted so that the distance between a sensor composed of a detection coil adapted to be energized by a high frequency signal of a predetermined frequency and the surface of an object to be measured is detected by utilizing a mutual inductive action between the sensor and the object and by detecting a change in the impedance of the detection coil, and wherein the sensors of the distance measuring units are arranged close to each other in a row at the positions along a predetermined reference line so as to combine the measured results of the sensors and thereby to measure the irregular contour of the object, whereby the sensors are sequentially energized at a predetermined scanning period and the output of each of the sensors during each scanning cycle is stored in an associated memory, thereby to produce for each scanning cycle a contour output signal combining the outputs of all the sensors.

In accordance with an embodiment of the invention, the contour measuring apparatus comprises a plurality of eddy-current distance measuring units, each thereof having a detection coil and a distance detecting circuit, a reference signal oscillator for energizing the detection coils, each constituting a sensor with a reference AC signal having a predetermined frequency, a frequency divider for dividing the frequency of the reference AC signal to produce a pulse signal of a predetermined frequency having a duty cycle of 50%, a scanning drive circuit responsive to the pulse signals from the frequency divider to sequentially energize the sensors each for half the period of the pulse signal, a plurality of memory circuits each adapted to temporarily store the output signal of associated one of the distance detecting circuits during the time required to complete one cycle of scanning for energizing all the detection sensors, a sampling circuit responsive to the output of the scanning drive circuit to apply a sampling pulse to each of the memory circuits in such a manner that the stored content of the memory circuit storing the output signal corresponding to the associated sensor is updated at the expiration of a predetermined delay time after the energization of the associated sensor by the scanning drive circuit, and contour signal producing circuit means for producing a contour output signal in accordance with all the stored contents of the memory circuits.

With the apparatus of the invention constructed in the abovedescribed manner, since the results of measurement will not be influenced by the mutual interference of the detection coils thus eliminating the need to provide a magnetic shield between the sensors, the size of the detection coils can be increased correspondingly thus making it possible to measure the contours of objects having relatively large irregularities, and moreover the detection coils can be decreased in size and weight thus making the installation of the apparatus easier, thereby making the apparatus widely suitable for measuring the contour of many different kinds of objects to be measured.

The invention is also capable of overcoming the deficiencies of the prior art method in which, even if the detection coils are actuated simultaneously and their distance output characteristics are adjusted, failure of any one or more of the distance measuring loops makes it necessary to readjust the characteristics, thereby making it difficult to use the apparatus continuously.

The above and other objects, construction and effects of the invention will become readily apparent from the following description of its preferred embodiment taken in conjunction with the accompanying drawings.

BRIEF DESCRIPTION OF THE DRAWINGS

FIG. 3 is a diagram showing the signal waveforms generated at various points in FIG. 2, in which the abscissa represents the time and the ordinate represents the amplitude of the signals.

DESCRIPTION OF THE PREFERRED EMBODIMENTS

Figure 1:
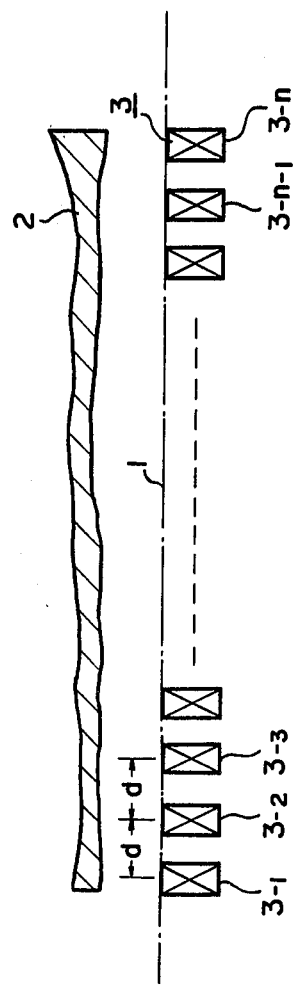
FIG. 1 is a diagram showing the positional relation of an object to be measured, a reference line and detection sensors relative to each other for the purpose of explaining the principle of contour measurement according to the invention.

Referring to FIG. 1, numeral 1 designates a reference line, 2 an object to be measured, and 3 detection sensors. The reference line 1 is set to provide positions in which the detection sensors 3 are placed in opposition to the object to be measured, and in practice the reference line 1 may take the form of, for example, the beam of a supporting frame which is extended substantially parallel to the surface of the object 2 subjected to the contour measurement, or alternatively, where the object 2 is in the form of a sheet steel, the reference line 1 may take the form of a sensor supporting beam which is extended in the width direction of the sheet steel feed passage in the rolling line.

In FIG. 1, the object 2 is in the form of a sheet steel whose cross-section is shown in the Figure, and it is assumed that the sheet steel is supported on a supporting means, such as a roller table which is parallel to the reference line 1.

A plurality of the detection sensors 3 are fixedly arranged at the equal spacing (d) in a row along the reference line 1 to cover the entire width of the object 2 and these detection sensors are designated by reference numerals 3-1, 3-2, 3-3 - - - , 3-n-1 and 3-n. Each of the detection sensors forms, for example, a distance measuring sensor including the detection coil of a distance measuring apparatus of the type disclosed in the previously mentioned U.S. patents, and the sensors 3-1 to 3-n are energized in turn, one after another, from the sensor 3-1 up to the sensor 3-n so as to self-scan repeatedly the distance between the reference line 1 and the surface of the object 2 over the entire width of the object 2. The self-scanning from the sensor 3-1 up to the sensor 3-n is accomplished in one scanning cycle, and this self-scanning process is performed repeatedly so that the contour of the object 2 is measured continuously, even if the object 2 is moved from the front toward the back of the plane of FIG. 1 relative to the sensors.

Figure 2:
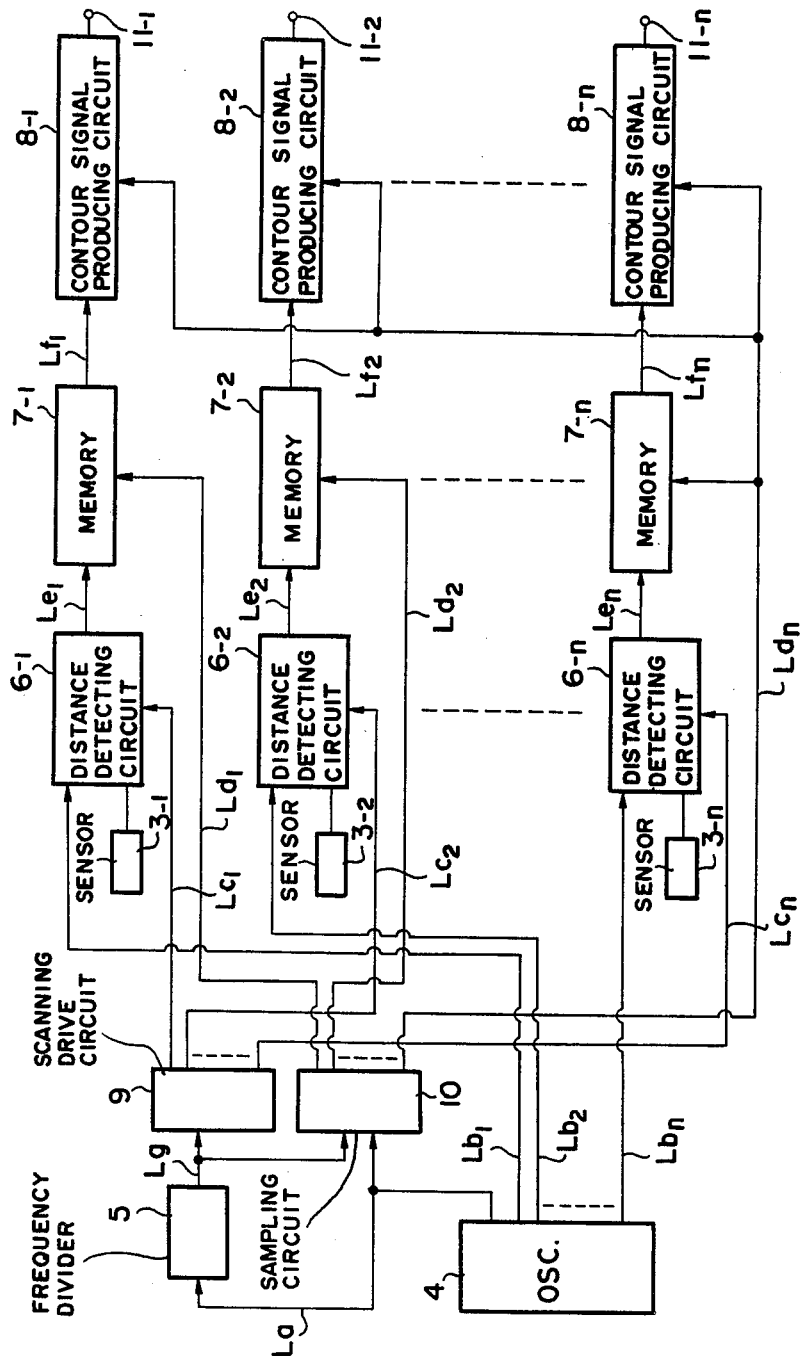
FIG. 2 is a block diagram showing the construction of an apparatus according to an embodiment of the invention.

FIG. 2 shows an exemplary construction of the apparatus of the invention which is designed to measure the cross-sectional contour of the object 2 through self-scanning by the previously mentioned row of detection sensors. In the FIGURE, numeral 4 designates a reference oscillator for generating a reference AC signal having a predetermined frequency and a predetermined amplitude, and 6-1, 6-2, - - - , 6-n distance detecting circuits respectively associated with the detection sensors 3-1, 3-2, - - - , 3-n. The construction of each of the distance detecting circuits is disclosed in detail in the previously mentioned U.S. patents and will not be described. Numeral 5 designates a frequency divider for receiving a part of the output of the reference oscillator 4 and dividing the frequency of the reference AC signal to produce an output of predetermined relatively low frequency; numerals 7-1, 7-2, - - - , 7-n designate memory circuits each adapted to receive and store the distance signal from corresponding one of the distance detecting circuits 6-1, 6-2, - - - 6-n, 8-1; numerals 8-2, - - - 8-n designate contour signal producing circuits, each adapted to read the distance signal from a corresponding one of the memory circuits and thereby to generate a group of distance signals at their respective output terminals 11-1, 11-2, - - - , 11-n at the end of each scanning cycle; numeral 9 designates a scanning drive circuit for sequentially energizing the sensors 3-1, 3-2, - - - , 3-n one by one to perform the self-scanning operation for half the period of the signal from the frequency divider 5; numeral 10 designates a sampling circuit for applying a stored content updating pulse to each of the memory circuits in response to the corresponding scanning in such a manner that, when a distance signal is generated from one of the distance detecting circuits, the distance signal is stored in the associated memory circuit in place of the previously stored content; and numerals La, Lb1, Lb2, - - - , Lbn, Lc1, Lc2, - - - , Lcn, Ld1, Ld2, - - - , Ldn, Le1, Le2, - - - , Len, Lf1, Lf2, - - - , Lfn, Lg designate signal lines.

As shown in (a) of FIG. 3, the oscillator 4 applies a reference AC signal having a predetermined frequency and amplitude to the frequency divider 5 and the distance detecting circuits 6-1, 6-2, - - - , 6-n through the signal lines la Lb1, Lb2, - - - , Lbn, and in FIG. 3(a) the period of the reference AC signal is indicated at $T_1$. The reference AC signal applied to the frequency divider 5 through the signal line La is divided to produce a predetermined relatively low frequency, and the resulting divided output is applied to the scanning drive circuit 9 and the sampling circuit 10 through the signal line Lg. Where the frequency of the reference AC signal is 50 KHz, for example, the 50 KHz reference AC signal is subjected for example to 1/16 frequency division by the frequency divider 5 as shown in FIG. 3(b), thus producing a 3125 Hz pulse signal having a 50% duty cycle. In this case, the period $T_1$ of the reference AC signal is 0.02 msec and consequently the resulting divided output has a period $T_2$ of 0.32 msec.

The scanning drive circuit 9 generates sequentially at its n output terminals pulse signals, each for half the period (or $T_2/2$) of the divided output, and the scanning drive circuit 9 may be formed by ordinary circuit construction of, for example, a shift register or ring counter, or the like. The pulse signals are applied to the distance detecting circuits 6-1, 6-2, - - - , 6-n through the signal lines Lc1, Lc2, - - - , Lcn so that the pulse signals, each having a pulse width $T_2/2$, are sequentially generated on the signal lines Lc1, Lc2, - - - , Lcn as shown in FIGS. 3(c) and (d), and consequently the pulse signals having the pulse width $T_2/2$ are sequentially applied to the distance detecting circuits 6-1, 6-2, . . . , 6-n. In this case, the pulse width $T_2/2$ is 0.16 msec or 8 times the period of the reference AC signal. The distance detecting circuits 6-1, 6-2, . . . , 6-n are so designed that each distance detecting circuit brings the associated detection sensor into operation during the time that a pulse signal is being applied to the circuit from the scanning drive circuit 9; that is, the detection coil constituting the detection sensor is interrupted from the circuit when no pulse signal is being applied to the distance detecting circuit, or concurrently the bias potential of the amplifier in the detecting circuit is controlled by a pulse signal to bring the amplifier into operation only when the pulse signal is being applied, thus causing only that distance detecting circuit receiving the pulse signal to energize the associated detection sensor, and thereby to generate a distance measurement output signal, while preventing energization of the detection sensors associated with the other distance detecting circuits. As a result, where the operating time of each detection sensor corresponds to $T_2/2$ and the number of the detection sensors is n, each of the detection sensors measures the distance between it and the surface of an object to be measured for the time $T_2/2$ at the repetition time intervals corresponding to $n \cdot T_2/2$ without any inductive interference of the other sensors. Namely, the sampling frequency of each sensor becomes $2/n \cdot T_2$ so that if the number of the detection sensors is 20, then the sampling frequency becomes 312.5 Hz, and the operating time of each detection coil becomes 0.16 msec.

The distance detecting circuits 6-1, 6-2, . . . , 6-n are each adapted to generate a distance signal in response to the application of a pulse signal thereto and the resulting distance signals are respectively applied and stored in the associated memory circuits 7-1, 7-2, . . . , 7-n through the signal lines Le1, Le2, . . . , Len. The memory circuits 7-1, 7-2, . . . , 7-n are each designed to update its stored content in response to a sampling pulse applied from the sampling circuit 10 through corresponding one of the signal lines Ld1, Ld2, . . . , Ldn, and the previously stored content is held until the application of the next sampling pulse.

As shown in FIGS. 3(e) and (f), the distance signal from each distance detecting circuit involves, during the initial period of the operating time, an error due to a delay of the transient response characteristic, and there is some delay time until the operation is stabilized and an accurate distance signal is generated. Consequently, as an example, the sampling circuit 10 is designed so that, as shown in FIGS. 3(g) and (h), its sampling pulses are each generated at the expiration of a predetermined delay time from the rising edge transition of an output pulse signal of the scanning drive circuit 9 or at the beginning of the fourth period of the reference AC signal. Thus, sampling circuit 10 could be implemented by any known circuit which performs a differentiation operation followed by a delay operation. These sampling pulses are sequentially generated at the n output terminals of the sampling circuit 10 in synchronism or correspondence with the operation of the scanning drive circuit 9; that is, as shown in FIGS. 3(c) and (g), a sampling pulse is delivered to the signal line Ld1 while a pulse signal is being generated at the signal line Lc1, and a sampling pulse is delivered to the signal line Ld2 while a pulse signal is being generated at the signal line Lc1, as shown in FIGS. 3(d) and (h). In the like manner, a sampling pulse is delivered to each of the remaining signal lines up to the signal line Ldn in sequence, and this process is repeated.

Consequently, when the sampling pulse shown in FIG. 3(g) is applied to the memory circuit 7-1, the distance signal generated from the distance detecting circuit 6-1 and having an amplitude $A_1$ as shown in FIG. 3(e) is stored in the memory circuit 7-1 in place of the distance measurement signal which was stored therein $n \cdot T_2/2$ time ago, and consequently the memory circuit 7-1 continuously generates the output signal of the amplitude $A_1$ as shown in FIG. 3(i) until the next sampling pulse is applied thereto through the signal line Ld1 after the expiration of the next $n \cdot T_2/2$ time. In like manner, when a sampling pulse arrives on the signal line Ld2 as shown in FIG. 3(h), the distance signal (amplitude A₂) generated from the distance detecting circuit 6-2 as shown in FIG. 3(f) is stored in the memory circuit 7-2, and consequently the memory circuit 7-2 continuously generates its output signal of the amplitude A₂ as shown in FIG. 3(j) until the next sampling pulse arrives on the signal line Ld2 at the expiration of the next n·T₂/2 time. Thus, by the time that the nth memory circuit 7-n has received a sampling pulse through the signal line Ldn, the memory circuits 7-1, 7-2, . . . , 7-n have each generated a distance signal for each scanning cycle period (n·T₂/2) which corresponds to the distance between the associated detection sensor and the object to be measured. When this occurs, the contour signal producing circuits 8-1, 8-2, . . . , 8-n read the corresponding distance signals from the memory circuits and generate contour output signals at their output terminals 11-1, 11-2, . . . , 11-n. In other words, the contour output signal generated at the output terminal 11-1 corresponds to the distance between the reference line 1 and the surface of the object to be measured at the position of the detection sensor 3-1, and similarly the output signals generated at the output terminals 11-1, 11-2, . . . , 11-n each corresponds to the distance between the reference line 1 and the surface of the object at the position of the detection sensors 3-1, 3-2, . . . , 3-n. Since the spacing between the detection sensors has a fixed value d, the contour output signals produced at the output terminals 11-1, 11-2, . . . , 11-n can eventually be converted by, for example, a recording instrument (which is not shown) to a contour information of the object at the fixed spacings d. While, in the embodiment described so far, the reference line 1 is established as a straight line parallel to the pass plane of an object to be measured, the reference line which provides a basis for arranging the detection sensors may take the form of any curved line in a two-dimentional plane parallel to the pass plane, or the detection sensors may be arranged in a three-dimensional manner, and usually the sensors are arranged parallel to the normal contour of an object to be measured.

Further, while, in the embodiment shown in FIG. 2, the distance detecting circuits are equal in number to the detection sensors, it is possible to use a common distance detecting circuit so that a plurality of detection sensors are sequentially connected one at a time to the common distance detecting circuit in response to the pulse signals from the scanning drive circuit.

Further, while detection sensors are all caused to perform the self-scanning operation in sequence during each scanning cycle, a plurality of detection sensors, which are arranged at such spaces as to cause no inductive interference therebetween, may be formed into a plurality of groups so as to perform the self-scanning operation simultaneously group, by group and thereby to reduce the required scanning time for each scanning cycle in dependence on the number of the groups.

The distance detecting circuits used in the apparatus of this invention are not limited to the type disclosed in the previously mentioned three U.S. patents, and any of the known eddy-current type distance detecting circuits may be used. However, the distance detecting circuits of the type disclosed in the previously mentioned three U.S. patents should preferably be used from the linearity standpoint of the measuring characteristic, although the present invention is not intended to be limited thereto.

Thus, in accordance with the apparatus of the invention it is possible to overcome the deficiencies of the prior art in the following cases:

(i) Where the movement of the measuring apparatus is restricted in time.

(ii) Where the cross-sectional contour of an object to be measured varies with time in the arrangement of FIG. 1.

(iii) Where the object is moved from side to side in FIG. 1.

(iv) Where the object is moved vertically to the plane of FIG. 1.

(v) Where the conditions of (ii), (iii) and (iv) occur simultaneously.

(vi) Where any two of the conditions stated in (ii), (iii) and (iv) occur simultaneously.

While one may be doubtful about the effectiveness of the method of scanning at the period of n·T₂/2 in cases where the period of change of the distance between the object and the sensors is decreased due to, for example, an increase in the feed speed of the object, this problem can be overcome by effecting the required sampling with a sampling frequency f selected to satisfy the following equation, according to Shannon's sampling theorem:

$$f > \frac{1}{2Td}$$

where Td represents the period of change of the distance and f=2/n·T₂.

To give an example, if, for example, T₂/2=160 (μsec) and n=20, each detection coil repeatedly measures the distance at 312.5 Hz, and this is the same as though the measurement is accomplished continuously.

While preferred forms and arrangements have been shown in illustrating the invention, it is to be clearly understood that various changes in detail and arrangement may be made without departing from the spirit and the scope of this disclosure.

What is claimed is:

1. In a contour measuring apparatus, comprising eddy-current distance measuring means for measuring a contour of a conductive object, said eddy-current distance measuring means including a plurality of detection sensors arranged in a row along a predetermined reference line which provides measuring reference positions with respect to said conductive object to be measured so that the distance between each of said detection sensors and a surface of said conductive object is detected to measure said contour of said conductive object, each of said detection sensors including a detection coil, said eddy-current distance measuring means further including an oscillator for energizing each of said detection coils with a reference alternating signal having a predetermined frequency and amplitude, and a distance detecting circuit for detecting a change in the impedance of each of said detection coils varying in accordance with the distance between each said detection coil and said conductive object due to a mutual inductive action therebetween; the improvement comprising:

scanning means for energizing said detection sensors sequentially one at a time and in accordance with a unit scanning period corresponding to plural times the period of said reference alternating signal;

memory means for receiving measurement signals corresponding to distances sequentially measured by said detection sensors at said unit scanning period, said measurement signals being received sequentially from said distance detecting circuit and stored temporarily for a time duration in which a cycle of the scanning of all said detection sensors is completed;

contour signal producing means for reading a stored content of said memory means and generating a corresponding contour signal each time said cycle of scanning is completed; and sampling means for providing an update signal to said memory means in accordance with energization of each of said detection sensors at said unit scanning period, said memory means being responsive to said update signal for updating its stored content with a measurement signal from said energized detection sensor after a predetermined delay time with respect to the time of beginning of the energization thereof.

2. In the apparatus as set forth in claim 1, wherein said scanning means comprises frequency dividing means for dividing said reference alternating signal to produce a pulse signal of a predetermined frequency having a 50% duty cycle, and scanning drive means responsive to the pulse signals from said frequency dividing means for sequentially energizing said detection sensors so that each of said detection sensors is energized for half the period of said pulse signal.

3. In the apparatus as set forth in claim 1, wherein said sampling means provides a final update signal in accordance with energization of a last one of said detector sensors at the end of said cycle of scanning, said contour signal producing means being responsive to said final update signal for reading said stored content of said memory means and generating said corresponding contour signal each time said cycle of scanning is completed.

* * * * *